(12) United States Patent
Burnes

(10) Patent No.: US 10,421,900 B2
(45) Date of Patent: Sep. 24, 2019

(54) HIGHLY EMISSIVE SPACE COMPATIBLE MATERIAL

(71) Applicant: Raytheon Company, Waltham, MA (US)

(72) Inventor: Clifford S. Burnes, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 881 days.

(21) Appl. No.: 14/640,441

(22) Filed: Mar. 6, 2015

(65) Prior Publication Data

US 2015/0225641 A1 Aug. 13, 2015

Related U.S. Application Data

(60) Provisional application No. 61/983,259, filed on Apr. 23, 2014, provisional application No. 61/982,019, filed on Apr. 21, 2014, provisional application No. 61/980,875, filed on Apr. 17, 2014.

(51) Int. Cl.
  C09K 11/02 (2006.01)
  C09K 11/65 (2006.01)
  F41G 7/00 (2006.01)
  G01S 3/78 (2006.01)

(52) U.S. Cl.
  CPC .......... C09K 11/025 (2013.01); C09K 11/655 (2013.01); F41G 7/004 (2013.01); G01S 3/7803 (2013.01)

(58) Field of Classification Search
  CPC ........................ C09K 11/025; B05D 3/0473
  USPC .......... 419/12–28; 428/450, 446; 427/248.1, 427/377; 252/301
  See application file for complete search history.

(56) References Cited

U.S. PATENT DOCUMENTS

| | | | |
|---|---|---|---|
| 2011/0091345 A1* | 4/2011 | Pandey | B22F 5/106 419/12 |
| 2011/0206937 A1* | 8/2011 | Schmidt | C04B 41/009 428/450 |
| 2014/0175082 A1 | 6/2014 | Burnes | |

* cited by examiner

*Primary Examiner* — Monique R Peets
(74) *Attorney, Agent, or Firm* — Cantor Colburn LLP

(57) ABSTRACT

An emissive material includes a source of alumina in an amount between about 20 and about 30 weight % (wt. %), $B_4C$ in an amount between about 10 and about 20 wt. %, and SiC in an amount between about 55 and about 65 wt. %.

20 Claims, 4 Drawing Sheets

HIGHLY EMISSIVE SPACE COMPATIBLE MATERIAL

CROSS-REFERENCE TO RELATED APPLICATIONS

This application claims benefit of U.S. Provisional Patent Application Ser. No. 61/983,259, filed Apr. 23, 2014; U.S. Provisional Patent Application Ser. No. 61/982,019, filed Apr. 21, 2014; and U.S. Provisional Patent Application Ser. No. 61/980,875, filed Apr. 17, 2014; each of which are incorporated herein in their entirety.

BACKGROUND

The present disclosure relates to emissive materials, and more particularly, to emissive materials for space and/or vacuum applications.

Electric power lines, mammal bodies, vehicle engines, and aircrafts are examples of living organisms and objects that produce and retain heat. These objects and bodies are visible in the infrared (IR) wavelengths of light against objects in the background because hot bodies strongly radiate IR waves. The objects in the background are relatively cooler objects.

Missile guidance systems use IR seekers to track and follow targets by locating the IR emissions from the targets. IR seekers can be IR temperature sensors and can be calibrated to identify object temperatures based on the object color in an IR photograph. IR sensors are also used in space based systems. Cryogenic vacuum chambers simulate space conditions. Cryogenic blackbody cores are used to characterize or calibrate IR sensors.

Teaching, characterizing, and calibrating an IR sensor or seeker to record specific colors corresponding to specific temperatures involve several steps. Initially, a cryogenic blackbody core, an IR source, is heated. Then a temperature sensor reads the temperature of the heated blackbody core. An IR camera takes a photograph of the heated blackbody core and displays colors according to the temperature of the blackbody. The IR seeker memory is programmed to store a color-temperature association between the measured temperature and the color of the object on the IR photograph. The IR seeker is programmed to know that the color displayed by the blackbody core corresponds to the temperature read by the temperature sensor.

Surface materials used in cryogenic vacuum (space) rated IR sources and blackbody cores must be highly emissive (low reflectance) and not susceptible to vaporization induced mass loss. High emissivity and vaporization-induced mass loss properties also must be sustainable over the temperature and spectral range that the IR source operates. Further, in some instances, the surface material must substantially bond to other materials. However, currently available coatings in cryogenic vacuum rated IR sources, e.g., oxide coatings such as ATK's vacuum rated blackbody coating, a proprietary coating of stainless steel oxide, have substantially non-flat spectral reflectivity curves and can degrade under high thermal operations.

SUMMARY

According to one embodiment, an emissive material includes a source of alumina in an amount between about 20 and about 30 weight % (wt. %), $B_4C$ in an amount between about 10 and about 20 wt. %, and SiC in an amount between about 55 and about 65 wt. %.

In another embodiment, an emissive material includes a source of alumina in an amount between about 20 and about 30 wt. %, $B_4C$ in an amount between about 10 and about 20 wt. %, and SiC in an amount between about 55 and about 65 wt. %. The emissive material is a ceramic core material of a cryogenic vacuum instrument.

Yet, in another embodiment, a method of making an emissive material includes mixing between about 20 and about 30 wt. % of an alumina source, between about 10 and about 20 of $B_4C$, between about 55 and about 65 wt. % SiC, and a surfactant in an aqueous solution to form a mixture.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
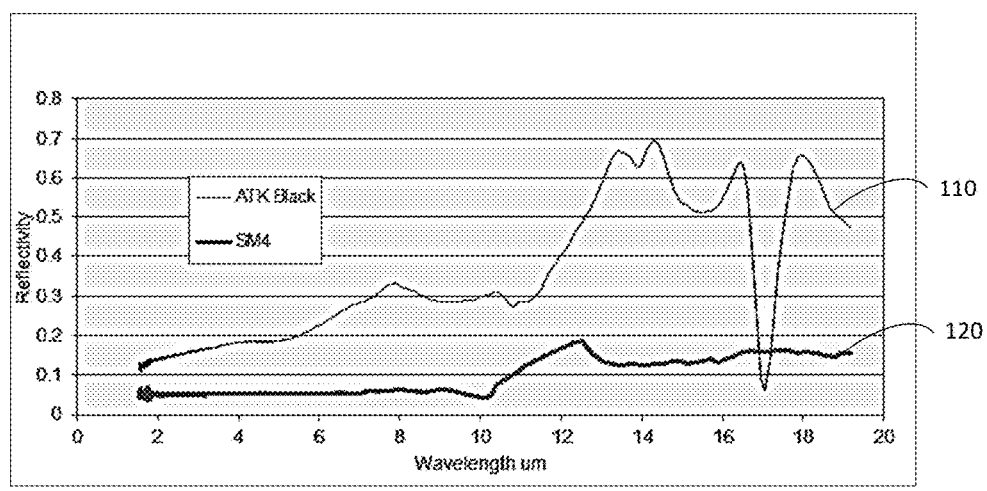
FIG. 1 is a graph of total reflectivity of two emissive materials.

Disclosed herein are highly emissive materials, cryogenic vacuum instruments using those materials, methods of making the materials, and methods of using the materials in cryogenic vacuum instruments, such as IR sensors and/or blackbodies.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

As used herein, the terms "percent by weight," "% by weight," and "wt. %" mean the weight of a pure substance divided by the total dry weight of a compound or composition, multiplied by 100. Typically, "weight" is measured in grams (g).

The emissive materials and methods of the present disclosure can be configured for use in a variety of environments and for a variety of applications. For example, the emissive material can be used as a material inside a blackbody core within a cryogenic vacuum environment or instrument for space applications. The emissive material can be used inside a cryogenic vacuum (space) rated IR source. The emissive material disclosed advantageously provides an emitting surface that is highly emissive and does not substantially lose mass due to vaporization over the temperature and spectral range that cryogenic vacuum (space) rated IR sources operate.

Emission is the process by which a higher energy quantum mechanical state of a particle becomes converted to a lower one through the emission of a photon, resulting in the production of light. The frequency of light emitted is a function of the energy of the transition.

Theoretically, an ideal blackbody has an emissivity of one ($\varepsilon=1$). However, a highly emissive real object or material has an emissivity less than 1, such as 0.99 or 0.999. In practical applications, there are two types of emissivity, real emissivity and apparent emissivity. Real emissivity (also known as actual emissivity) is the emissivity of a flat surface of a material. Real emissivity of a flat piece of material is determined according to the following equation: $\varepsilon+R=1$, wherein $\varepsilon$ is the emissivity, and R is the reflectivity. Apparent emissivity is the emissivity measured by an IR sensor.

Reflectivity is determined by using a high temperature blackbody to project energy into a monochromator. A monochromator is a device that uses gratings to separate broadband energy into small frequency bands of energy. The output of the monochromatic energy is recorded on a detector as $I0_\lambda$. Then the sample material is added to the path so that energy reflects off of the material (e.g., like a mirror). The reflected energy is recorded as $I_\lambda$. Reflectivity (R), as a function of wavelength, is then calculated as $I_\lambda/I0_\lambda=R$ (see FIG. 1). Accordingly, emissivity is determined by using the equation: $\varepsilon+R=1$.

The highly emissive material disclosed herein is spectrally black and durable enough to withstand the high thermal operating conditions of cryogenic vacuum rate IR sources, such as black bodies. The emissive material is suitable for use within a black body because the material is spectrally black over an IR wavelength range and durable for such an environment. Highly emissive materials demonstrate low amounts of reflectance.

The emissive material has a band (2 to 15 microns) emissivity greater than 0.8 over a wavelength range of 10 to 19 microns. The emissive material has an emissivity greater than 0.95 over a wavelength range of 2 to 10 microns. Once the emissive material is formed into a cone shape or a cylindrical shape, the enhanced emissivity will be higher than 0.99 over a wavelength range of 2 to 10 microns (see FIG. 4, discussed below).

Referring to FIG. 1, the emissive material disclosed herein (SM4) 120 has a low total reflectivity (less than about 0.2 or 20%) that is substantially flat over the wavelength range between about 2 and about 15 microns. In contrast, ATK's proprietary blend, "ATK Black," 110 has a higher non-flat total reflectivity.

Generally, a lower and flatter reflectivity spectrum is desired for emissive materials because the energy generated from a blackbody is a known flux. Any energy incident to and reflected off of the material is a false photon that provides incorrect measurements on a sensor. A method for measuring reflectivity is described above.

The emissive material does not experience substantial vaporization induced mass loss at high temperatures, for example temperatures greater than 77 Kelvin (K) and vacuum levels $>1\times10^{-7}$ Torr. Vaporization induced mass losses can occur in a vacuum environment. In contrast to oxides, the emissive material does not experience substantial mass losses in a vacuum environment. The emissive material is substantially resistant to vaporization induced mass losses at temperatures up to 1000 K and vacuum levels $>1\times10^{-7}$ Torr.

Vaporization induced mass losses can be calculated by a National Aeronautics and Space Administration (NASA) method as follows. The material is placed on a scale in a vacuum environment on a cryo-cooled plate and then heated. The weight of the material is measured before and after heat exposure to determine mass loss. Also, the cryo-cooled plate will attract material mass that boils off the sample. Thus, the cryo-cooled plate also can be checked for mass gain.

Another method to assess mass loss is to run a Residual Gas Analyzer (RGA), which is a small mass spectrometer. The RGA will measure the atomic mass units of any material that has vaporized in a vacuum space.

The emissive material disclosed herein can also be combined or layered with other ceramic materials, e.g., SiC. When fired (heated) at the appropriate temperature, the emissive material can permanently bond to another ceramic material. Thus, the emissive material is suitable for use as an emissive layer in a cryogenic vacuum rated IR source, such as a black body, as described below.

The emissive material includes a source of alumina in an amount between about 10 and about 20 wt. %, $B_4C$ in an amount between about 10 and about 20 wt. %, and SiC in an amount between about 55 and about 65 wt. %. In some embodiments, the emissive material includes a source of alumina in an amount between about 22 and about 28 wt. %, $B_4C$ in an amount between about 12.5 and about 17.5 wt. %, and SiC in an amount between about 58 and about 63 wt. %. In other embodiments, the emissive material includes a source of alumina in an amount about or in any range between about 20, 21, 22, 23, 24, 25, 26, 27, 28, 29, and 30 wt. %; $B_4C$ in an amount about or in any range between about 10, 11, 12, 13, 14, 15, 16, 17, 18, 19, and 20 wt. %;

and SiC in an amount about or in any range between about 55, 56, 57, 58, 59, 60, 61, 62, 63, 64, and 65 wt. %.

The source of alumina can be aluminum oxide (e.g., $Al_2O_3$ or $Al_2O_3 \cdot 3H_2O$). When $Al_2O_3$ is used, the $O_3$ burns off in the sintering process. Alternatively, aluminum hydroxide, which is $Al_2O_3$ and water, may be used.

The grain size of the source of alumina can generally vary and is not intended to be limited. In one embodiment, the grain size of the source of alumina is in a range between about 0.1 and about 1.1 microns, or between about 0.3 and about 0.9 microns.

The grain size of the $B_4C$ can generally vary and is not intended to be limited. In some embodiments, the grain size of the $B_4C$ is in a range between about 2.8 and about 4.8 microns, or between about 3.4 and about 4.2 microns.

The grain sizes of the silicon and carbon in the SiC can generally vary and is not intended to be limited. In some embodiments, the grain size of the silicon is in a range between about 6 and about 26 microns, or between about 10 and about 21 microns. In other embodiments, the grain size of the carbon is in a range between about 25 and about 150 microns, or between about 40 and about 120 microns.

The emissive material disclosed herein has a higher emissivity than conventional ceramic materials (e.g., SiC) used in cryogenic vacuum IR sources. The emissive material also has a lower thermal conductivity and reactivity to the heating stimulus. Thus, the emissive material disclosed herein can be applied as a higher emissivity coating on top of a conventional ceramic material. The emissive material can be applied as a coating on top of the cast ceramic core while the core is still in the green state (described below). Then, after firing (heating) the ceramic core, the emissive material and the ceramic core substantially bond to form a single substantially homogenous material or layer.

The emissive material disclosed herein is an alumina bonded silicon carbide with boron carbide. The emissive material can be formed into a slip cast ceramic compound, formed in an aqueous (or water) based solution. The above amounts of an alumina source and SiC are combined/mixed with SiC in a dry powder to form alumina bonded SiC. The alumina bonded SiC is then combined/mixed with dry $B_4C$. The dry powder mixture is added to an aqueous solution (or water) and a surfactant (e.g., less than 1 wt. %) for slip casting.

Slip casting can be used for form articles of the emissive material having any shape. However other methods known in the art can be used. In slip casting, the aqueous mixture/slurry is poured into a mold of any shape or size and allowed to form a layer, the cast, on the inside cavity of the mold. Once the dry mixture has absorbed most of the liquid, the shaped cast piece is removed from the mold, optionally trimmed, and allowed to dry. The dried cast is then referred to as a greenware piece (or in the "green state"). The cast in the green state is then heated (or fired) to a high enough temperature in the presence of an inert gas (e.g., argon gas) to allow the $B_4C$ and SiC to sinter. For example, the temperature can be in a range between about 1150 and about 1315° C.

The slip cast emissive material can stand alone, for example the emissive material can be used as a single layer, surface, or core of a cryogenic vacuum rated IR source (e.g., a black body). The emissive material also can be added to or combined with another ceramic material, structure, or layer. For example, the emissive material can be disposed onto, painted onto, coated on, or brushed onto another ceramic material, structure, or layer. The other ceramic material, structure, or layer can be in the green state, and subsequently, the combination of materials or the structure can be fired to produce a final homogenous single material.

The emissive material can be used in a blackbody core. The emissive material can be used as a single homogenous material. The emissive material also can be used as a layer of the blackbody core or other cryogenic vacuum instrument. For example, a blackbody core can include a first exterior layer (an absorptive layer), and the emissive material can be a second interior layer (emissive layer). The emissive material layer can be sintered together with the other layer during a firing (heating) process to form a single homogenous unit/layer.

The emissive material can be dimensioned, formed, and shaped into any size or shape. For example, the emissive material can be shaped into a hollow shape, such as a hollow sphere, cylinder, cone, or cube. The emissive material can be shaped into a sold shape, such as a sphere, cylinder, cone, or cube. The thickness of the shaped emissive material depends on the application and can generally vary.

Figure 4:
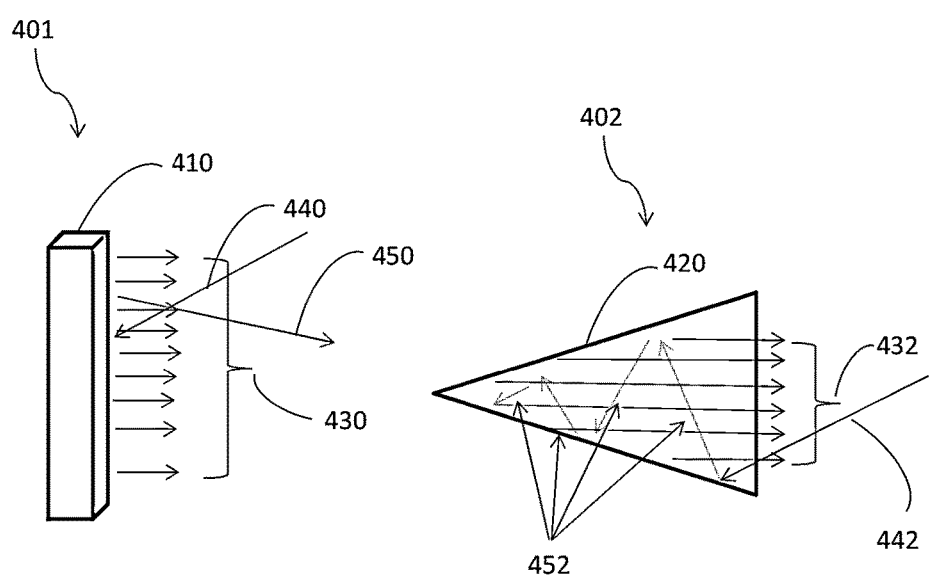
FIG. 4 is a schematic diagram of how cavity enhanced emissivity can be used to increase the apparent emissivity to the emissive material.

FIG. 4 is a schematic diagram of how cavity enhanced emissivity can be used to increase the apparent emissivity to the emissive material. For example, once the emissive material is formed into a cone shape or a cylindrical shape, the enhanced emissivity will be higher than 0.99 over a wavelength range of 2 to 10 microns. Emissivity of a material in the shape of a rectangular prism 401 is compared to a cone shape 204. When light energy is incident 440 upon the rectangular prism 401, 80% is absorbed, 20% is reflected 450, and photons are additionally generated by heat 430. When the material is in the shape of a rectangular prism 401, it has a reflectivity of 0.2. In comparison, when the same material is formed into a cone shape 204, the incident light energy 442 travels through and bounces 452 off the interior surfaces of the material. As a result, 80% of the energy is absorbed, and 20% is reflected with every bounce. By the time the light reflects off of the back of the cone, most of the energy has been absorbed. Cavity enhanced emissivity is calculated as $1-R^{\# \ of \ bounces}$. After just 4 bounces, 99.8% of the energy is absorbed ($1-0.2^4=0.998$). Then, only photons generated from the heated interior of the cone surfaces are emitted 432. Thus, cavity enhancement can be used as a "light trap" to increase the apparent emissivity of the emissive material disclosed herein.

Black body parts can generally vary, but can include a blackbody core (or emitting cone), waveguide, cooling tubes, cryo-hose adapters, heater rods, and cryogenic lines. The emitting material can be used as a layer of the blackbody core as described above, or as a single unit of the blackbody core. Although blackbodies can include more or less components. The blackbody generates heat from the heater rods and emits IR light through the emitting cone/core. The IR light emissions exit the blackbody through an opening in the foreshield. The blackbody characterizes an IR seeker for space-based operations.

EXAMPLES

Example 1

The emissive material (alumina bonded SiC with $B_4C$) was prepared as a slip cast ceramic compound in water. Dry weights of the following powders were combined: 22.6 wt. % (0.6 micron grain size) alumina ($Al_2O_3$), 15.7 wt. % (3.8 micron grain size) $B_4C$, and 61 wt. % (16 micron and 53-106 micron grain size) SiC. The dry mix was combined with water and <0.7% surfactant to form a slurry. The slurry was slip cast using standard procedures (poured into a mold and fired at a high enough temperature to allow the B$_4$C to sinter in an argon purge).

Example 2

Figure 2:
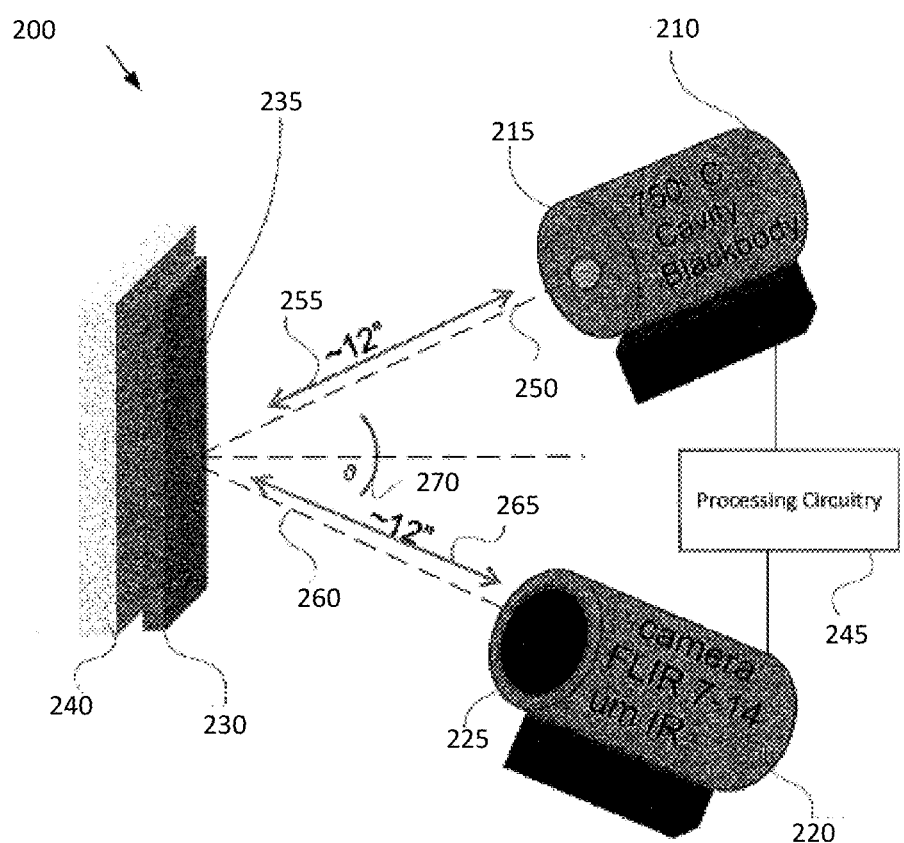
FIG. 2 is a schematic diagram of a method for determining emissivity of the emissive material.

The emissivity of the emissive material was analyzed and compared to other materials. FIG. 2 illustrates the experimental setup. System 200 included a heat source 210, an IR camera 220, the sample material 230 to be tested, a background material 240, and processing circuitry 245. The heat source 210 included a cavity 215 that heated to a temperature of ~750° Celsius (C). The heat source 210 emitted the heat in the form of light waves 250 (i.e., IR waves) that traveled from the cavity 215 onto the surface 235 of the sample material 230. The emissivity of alumina bonded SiC with B$_4$C as disclosed herein (FIGS. 3C and 3D) was compared to SiC (FIGS. 3A and 3B), aluminum bonded SiC, and B$_4$C.

The surface 235 of each sample material 230 was disposed a first distance 255 (about 12 inches) away from the heat source 210 and a second distance 265 (about 12 inches) away from the IR camera 220. The path of first distance 255 and the path of the second distance 265 emerged apart from each other at an angle 270 (about 5°) with a vertex at the center of the portion of the surface 235 of the sample material 230 where the light waves 250 are incident upon the surface 235.

When the heat source 210 was unblocked, the heat source 210 sent IR waves 250 toward the sample material 230. IR waves struck the surface 235 of the sample material 230 and the background material 240. The sample material 230 reflected the IR waves into the lens 225 of the IR camera 220, as shown in the IR photographs in FIGS. 3B and 3D.

Figure 3A:
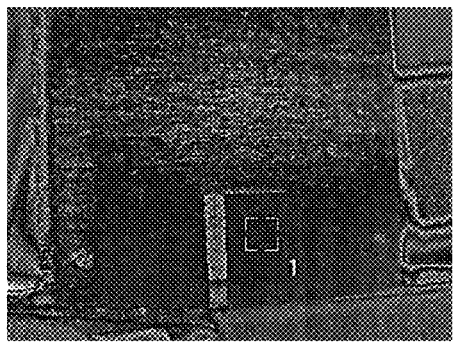
FIG. 3A is an IR photograph of a blocked sample of SiC.
Figure 3B:
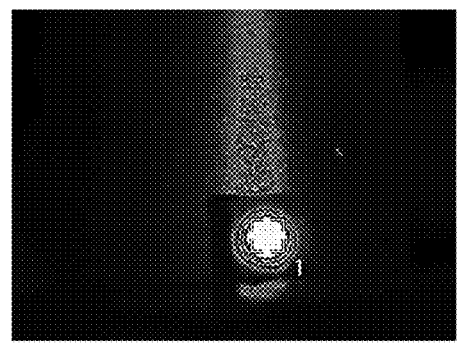
FIG. 3B is an IR photograph of an unblocked sample of SiC.

Alternatively, when the heat source 210 was blocked, the heat source 210 did not send IR waves 250 toward the sample material 930. The only waves reflected into the lens 225 of the IR camera 220 were the IR waves emitted from the surface 235 of the sample material 230. The colors in FIGS. 3A and 3B show that no IR waves were reflected when the heat source 210 was blocked.

The background material 240 functioned as a control within the system 200. Measurements of the light wave reflected off the background material 240 into the lens 225 of the IR camera 220 were used to control IR emissivity tests. The background material 240 was disposed behind or underneath the sample material 230. Therefore, the sample material 230 blocked light waves 250 from reaching a portion of the surface of the background material 240. The background material 240 was an aluminum plate, which reflected IR energy.

During analysis, light waves 250 reflected off the surface 235 of sample material 230 along the path of the second distance 265 into the lens 225 of the IR camera. The IR camera 220 captured a first IR photograph (FIGS. 3A and 3C) that displayed an IR color of the surface of the sample material 230. The IR camera 220 sent signals to the processing circuitry 245 that indicated the angle 270, the temperature of the surface 235 of the material, and an IR photograph including the temperature-color of the surface of the material.

The processing circuitry 245 was coupled to the IR camera 220. The processing circuitry 245 received from the IR camera 220 the first IR photographs (FIGS. 3A and 3C) of the blocked background material 240, the temperature of the background material 240, and the angle 270. The processing circuitry 245 displayed the first IR photograph of the surface of the background material (the unblocked image). The processing circuitry 245 also received from the IR camera 220 the second IR photograph (FIGS. 3B and 3D) of the sample material 230 that blocked the energy from the IR cavity blackbody heat source 210, the temperature of the surface 240 of the sample material 230, and the angle 270. The processing circuitry 245 compared the temperature of the blocked image (FIGS. 3A and 3C) to the temperature of the unblocked images (FIGS. 3B and 3D) and calculated a difference (delta). The smaller the temperature difference (delta), the lower the reflectance. Lower reflectance correlated with higher emission, which was desired in a highly emissive material.

FIGS. 3A and 3B show IR photographs of blocked and unblocked, respectively, samples of SiC. The blocked and unblocked angles were 45°, and the temperature of the blocked sample (FIG. 3A) was 24.9° C. The temperature of the unblocked sample (FIG. 3B) was 148° C. The delta was 123.1° C., which indicated a high amount of reflectivity, and a low amount of emissivity.

Similarly, the blocked and unblocked images of a sample of alumina bonded SiC (not shown), at an angle of 45°, had temperatures of 24.5 and 143° C., respectively (delta=118.5). Thus, alumina bonded SiC also had high reflectance and low emissivity.

Blocked and unblocked images of a sample of B$_4$C (not shown), at an angle of 45°, had temperatures of 24.6° C. and 132° C., respectively (delta=107.4). Thus, B$_4$C also had high reflectance and low emissivity.

Figure 3C:
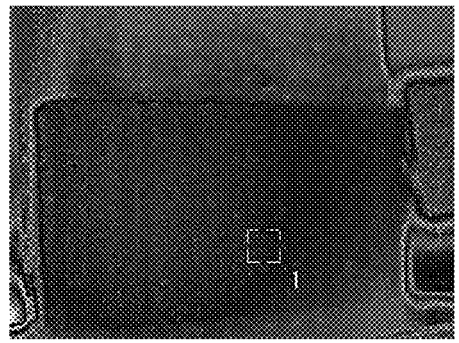
FIG. 3C is an IR photograph of a blocked sample of the emissive material.
Figure 3D:
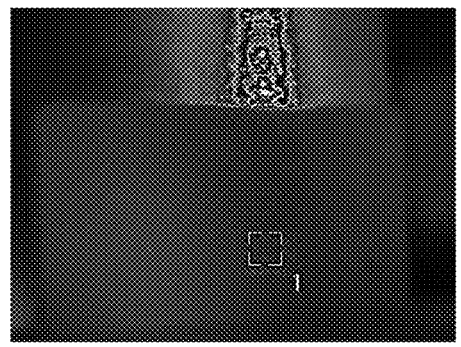
FIG. 3D is an IR photograph of an unblocked sample of the emissive material.

FIGS. 3C and 3C show IR photographs of blocked and unblocked, respectively, samples of the alumina bonded SiC with B$_4$C (the emissive material). The blocked and unblocked angles were 45°, and the temperature of the blocked sample (FIG. 3C) was 25.2° C. The temperature of the unblocked sample (FIG. 3D) was 25.6° C. The delta was 0.4° C., which indicated a low amount of reflectivity, and a high amount of emissivity.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An emissive material, consisting essentially of:
    a source of alumina in an amount between about 20 and about 30 weight % (wt. %);
    B$_4$C in an amount between about 10 and about 20 wt. %; and
    SiC in an amount between about 55 and about 65 wt. %.

2. The emissive material of claim 1, wherein the source of alumina is an aluminum oxide, an aluminum hydroxide, or any combination thereof.

3. The emissive material of claim 1, wherein the source of alumina is $Al_2O_3$.

4. The emissive material of claim 1, wherein the source of alumina is between about 22 and about 28 wt %.

5. The emissive material of claim 1, wherein the $B_4C$ is in an amount between about 12.5 and about 17.5 wt. %.

6. The emissive material of claim 1, wherein the SiC is in an amount in a range between about 58 and about 63 wt. %.

7. An emissive material, comprising:
   a source of alumina in an amount between about 20 and about 30 weight % (wt. %);
   $B_4C$ in an amount between about 10 and about 20 wt. %; and
   SiC in an amount between about 55 and about 65 wt. %;
   wherein the emissive material is a slip cast ceramic compound.

8. The emissive material of claim 7,
   wherein the emissive material is a ceramic core material of a cryogenic vacuum instrument.

9. The emissive material of claim 8, wherein the cryogenic vacuum instrument is an infrared source.

10. The emissive material of claim 8, wherein the emissive material is a coating.

11. The emissive material of claim 10, wherein the emissive material is bonded with a ceramic core material.

12. The emissive material of claim 8, wherein the emissive material does not have substantial vaporization induced mass loss at a temperature up to 1000 Kelvin (K) and vacuum levels $>1 \times 10^{-7}$ Torr.

13. The emissive material of claim 8, wherein the emissive material has an emissivity greater than 0.95 in a wavelength region of 2 to 10 microns.

14. The emissive material of claim 8, wherein the emissive material has a total reflectivity of less than 0.2 over a wavelength range of about 2 to about 15 microns.

15. The emissive material of claim 8, wherein the emissive material is spectrally black over an infrared wavelength range.

16. A method of making an emissive material, the method comprising:
    mixing between about 20 and about 30 wt. % of an alumina source, between about 10 and about 20 of $B_4C$, between about 55 and about 65 wt. % SiC, and a surfactant in an aqueous solution to form a mixture; and
    slip casting the mixture.

17. The method of claim 16, further comprising heating the mixture in an inert gas to sinter the $B_4C$ and the SiC.

18. The method of claim 16, wherein the source of alumina is an aluminum oxide, an aluminum hydroxide, or any combination thereof.

19. The method of claim 16, further comprising disposing the mixture as a coating onto another ceramic material.

20. The method of claim 19, further comprising heating the coating and ceramic material to form a substantially homogenous layer.

* * * * *